United States Patent
Li et al.

(10) Patent No.: US 9,167,434 B2
(45) Date of Patent: Oct. 20, 2015

(54) INTER-RADIO ACCESS TECHNOLOGY INTERFERENCE COORDINATION FOR MULTI-STANDARD RADIO ACCESS NETWORKS

(75) Inventors: Xiao-Dong Li, Ottawa (CA); Patrick Lie Chin Cheong, Ottawa (CA); Carl Cao, San Jose, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 583 days.

(21) Appl. No.: 13/569,776

(22) Filed: Aug. 8, 2012

(65) Prior Publication Data

US 2014/0044095 A1  Feb. 13, 2014

(51) Int. Cl.
*H04W 72/04* (2009.01)
*H04W 36/00* (2009.01)
*H04W 4/00* (2009.01)
(Continued)

(52) U.S. Cl.
CPC .............. *H04W 16/14* (2013.01); *H04W 52/40* (2013.01); *H04W 36/20* (2013.01); *H04W 52/146* (2013.01); *H04W 72/1215* (2013.01); *H04W 72/1226* (2013.01)

(58) Field of Classification Search
CPC . H04W 16/14; H04W 36/20; H04W 72/1215; H04W 72/1226; H04W 52/40; H04W 52/146
USPC .......................................... 370/331, 328, 329
See application file for complete search history.

(56) References Cited

U.S. PATENT DOCUMENTS

2009/0082026 A1  3/2009  Yavuz et al.
2009/0286569 A1  11/2009  Rousu et al.
(Continued)

FOREIGN PATENT DOCUMENTS

WO      2010090567 A1     8/2010
WO   WO 2010090567 A1 *  8/2010
(Continued)

OTHER PUBLICATIONS

Rongzhen Yang and Hujun Yin "Uplink Power Control for MIMO-OFDMA Cellular Systems", ZTE Corporation, ZTE Communications Magazine, Issue No. 4, 2011—Retrieved from the Internet: URL: http://wwwen.zte.com.cn/endata/magazine/ztecommunications/2011Year/no4/articles/20120 on Jul. 5, 2012 consisting of 13-pages.
(Continued)

*Primary Examiner* — Jung Park
*Assistant Examiner* — Albert Shih
(74) *Attorney, Agent, or Firm* — Christopher & Weisberg, P.A.

(57) ABSTRACT

A method and system for coordinated interference suppression in a communication system. The communication system implements at least a first radio access technology via a first base station and a second radio access technology via a second base station. The first and second radio access technologies differ from one another. Information relating to an interference signal received at the first base station via the first radio access technology is received at the second base station from a first device associated with the first base station, At a second device associated with the second base station, an interfering user equipment accessing the second base station via the second radio access technology is identified. The identification is based on the information received from the first device associated with the first base station. Interference caused by the identified interfering user equipment is suppressed by the second base station.

23 Claims, 5 Drawing Sheets

(51) Int. Cl.
*H04W 16/14* (2009.01)
*H04W 52/40* (2009.01)
*H04W 72/12* (2009.01)
*H04W 36/20* (2009.01)
*H04W 52/14* (2009.01)

(56) References Cited

U.S. PATENT DOCUMENTS

2011/0199944 A1* 8/2011 Chen et al. .................. 370/280
2011/0281600 A1* 11/2011 Tanaka ........................ 455/500
2014/0256337 A1* 9/2014 Wigren et al. ................ 455/450

FOREIGN PATENT DOCUMENTS

WO         2012053952 A1    4/2012
WO  WO 2012053952 A1 *  4/2012

OTHER PUBLICATIONS

International Search Report and Written Opinion dated Jul. 10, 2014 for International Application Serial No. PCT/IB2013/056038, International Filing Date: Jul. 23, 2013 consisting of 10-pages.

* cited by examiner

INTER-RADIO ACCESS TECHNOLOGY INTERFERENCE COORDINATION FOR MULTI-STANDARD RADIO ACCESS NETWORKS

FIELD OF INVENTION

The present invention relates to a method and system for interference coordination between two or more different radio access technologies.

BACKGROUND

When operators deploy long term evolution, LTE, carriers within the same frequency band as 2G/3G carriers (e.g., code division multiple access, CDMA), interference from a user equipment operating within the 2G/3G radio access technology may interfere with reception of signals by the LTE radio access technology infrastructure. Conversely, interference from a user operating within the LTE radio access technology may interfere with reception of signals by the 2G/3G radio access technology infrastructure. Interference is especially likely when multiple radio technologies co-exist in the same geographical coverage area and have carriers assigned adjacent to each other.

FIG. 1 is a plot of a CDMA signal 2 after despreading and an LTE signal 4 in an adjacent band. As can be seen, a portion 6 of the LTE signal 4 interferes with the CDMA signal 2, and to a lesser extent, a portion 8 the CDMA signal 2 interferes with the LTE signal 4. The problem is more severe on the uplink than the downlink because the user equipment, UE, is often a low cost consumer product and cannot afford to have a transmission filter as sharp as the transmission filter of a base station. The interference problem is exacerbated when an interfering user equipment is far from its serving base station but near the base station receiving the interference and is transmitting at maximum power, while a transmitter of another user equipment of a different technology is in a power limiting situation and is experiencing maximum path loss to its serving base station.

There are existing solutions to address inter-cell interference within a single radio access network, RAN, such as LTE. In such cases, a base station such as an evolved node B eNB, performs interference measurements and reports the measurements to other eNBs, which act to suppress an interference signal. For example, in one solution, a static allocation of a physical uplink control channel, PUCCH, away from an edge of a frequency band may be employed with the disadvantage of fragmenting uplink radio resources without adapting to changing interference conditions. Another solution involves random frequency allocation for physical uplink signal channel, PUSCH, with the disadvantage of not removing interference by the PUCCH. Fractional frequency reuse may be employed, but fractional frequency reuse is not applicable between different co-existing radio access technologies. In third generation partnership project, 3GPP, systems, an X2 interface may be employed to address inter-cell interference, but this is not applicable to interference between two different radio access technologies. Another solution is to rely on a large guard band between two potentially interfering signals, but this is spectrally inefficient.

SUMMARY

The present invention advantageously provides a method and system for coordinated interference suppression in a communication system that implements at least a first radio access technology via a first base station and a second radio access technology via a second base station, where the first and second radio access technologies differ from one another. According to one aspect, the invention provides for receiving from a first device associated with the first base station, at the second base station, information relating to an interference signal received at the first base station via the first radio access technology. At a second device associated with the second base station, an interfering user equipment accessing the second base station via the second radio access technology is identified. The identification is based on the information received from the first device associated with the first base station. An interference caused by the identified interfering user equipment is suppressed by the second base station.

According to another aspect, the invention provides an interference coordination device adapted to communicate with a first set of at least one base station operating according to a first radio access technology. The interference coordination device includes a receiver, a processor, and a transmitter. The receiver is configured to receive information relating to an interference signal received by a second base station operating according to a second radio access technology, the second radio access technology being different from the first radio access technology. The processor is configured to identify at least one likely source of interference originating in a sector covered by at least one of the first set of at least one base station to produce an interference report, the identifying being based on the information received by the receiver. The transmitter is configured to transmit the interference report produced by the processor to at least one of the first set of at least one base station, the interference report having information to enable a base station of the first set to identify an interfering user equipment.

According to yet another aspect, the invention provides a communication system configured to implement interference coordination between two different radio access technologies. The communication system includes a first interference coordination device configured to receive interference measurements from a first base station associated with a first radio access technology. A second interference coordination device in communication with the first interference coordination device is configured to receive interference control requests from the first interference coordination device based on the interference measurements, and to transmit first interference information to a second base station associated with a second radio access technology, the second radio access technology being different from the first radio access technology.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
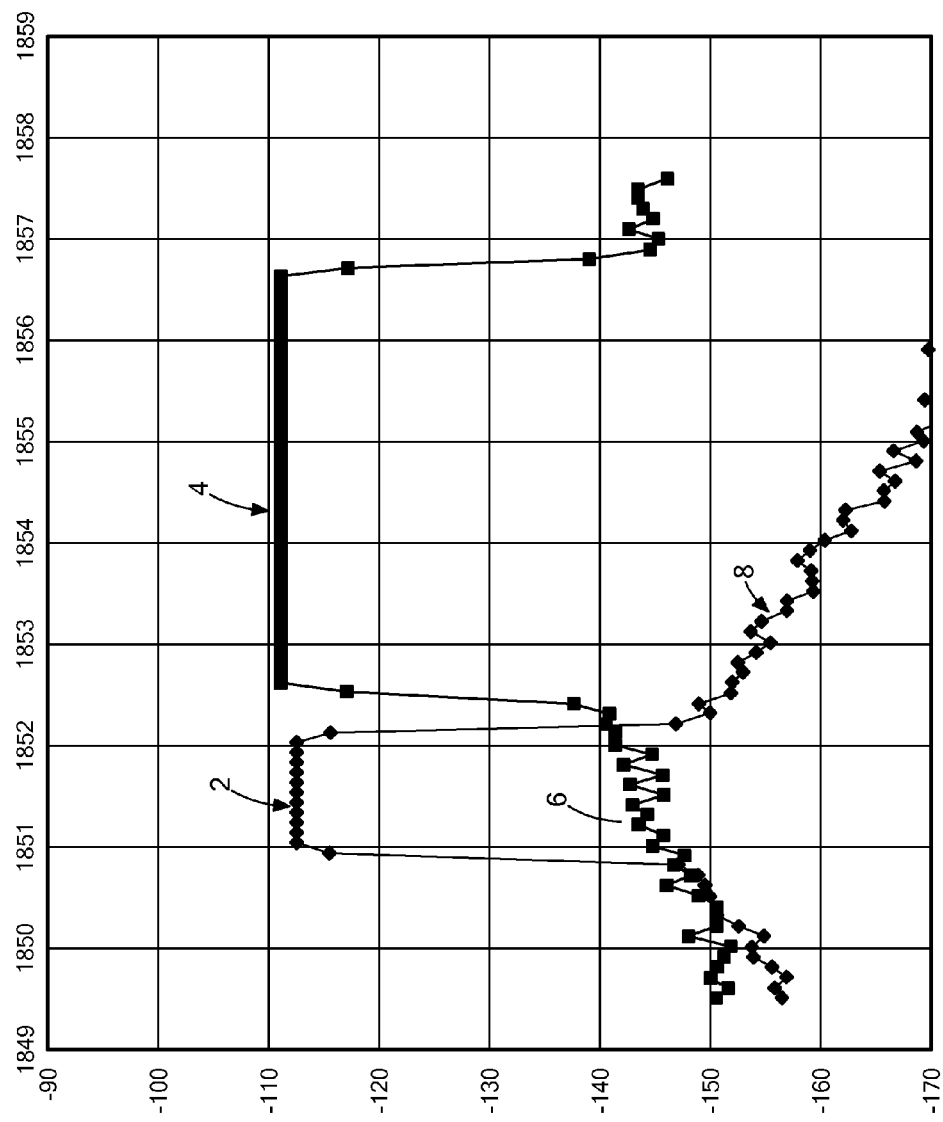
FIG. 1 is a plot of a code division multiple access, CDMA, signal after despreading and plot of an interfering long term evolution, LTE, signal in an adjacent band.

Before describing in detail exemplary embodiments that are in accordance with the present invention, it is noted that the embodiments reside primarily in combinations of apparatus components and processing steps related to coordinated interference suppression in a communication network having at least two different radio access technologies. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
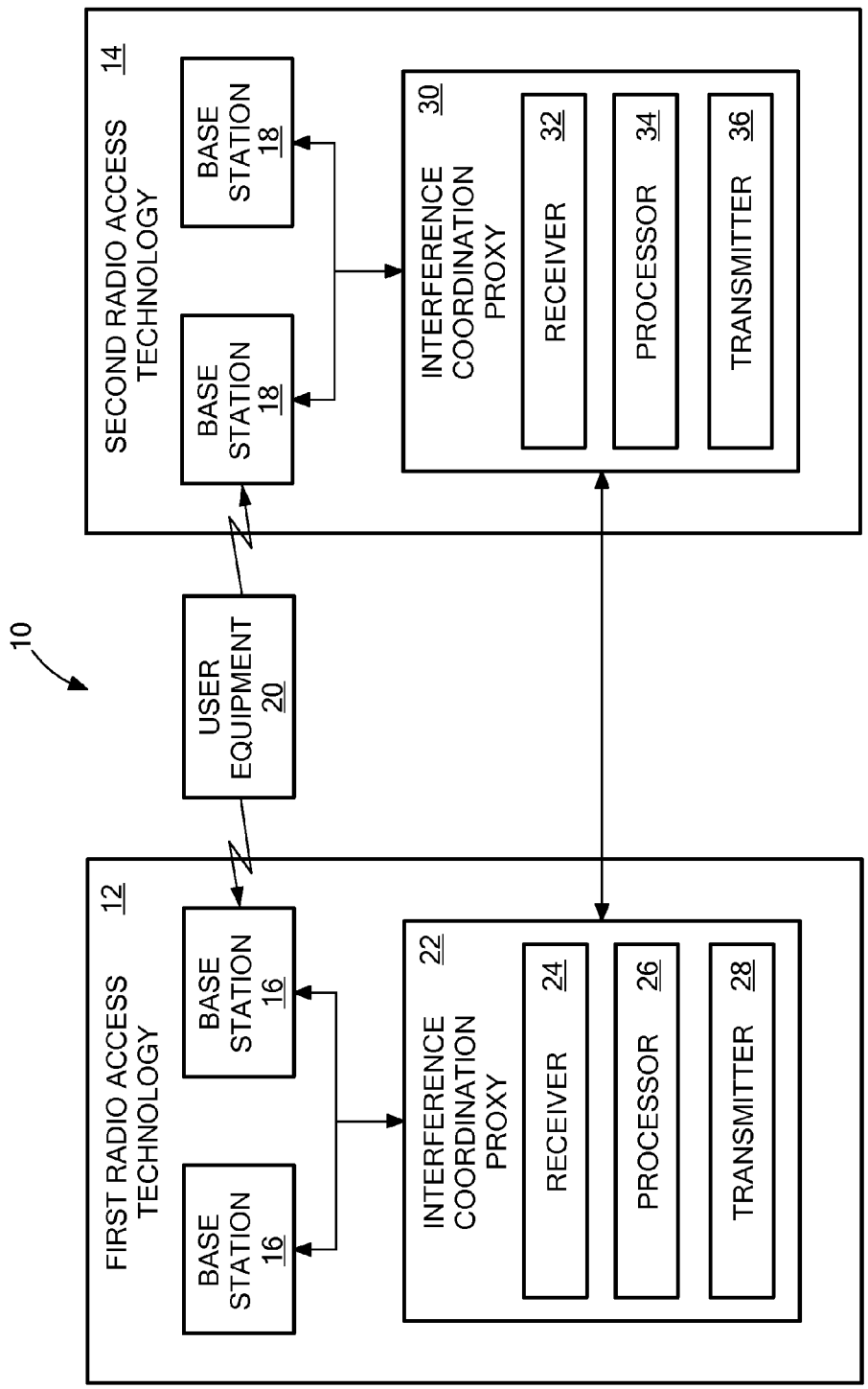
FIG. 2 is a block diagram of an exemplary communication system constructed in accordance with principles of the present invention.

Referring now to the drawing figures, in which like reference designators denote like elements, there is shown in FIG. 2 a block diagram of an exemplary communication system 10 constructed in accordance with principles of the present invention. The communication system 10 has a first radio access technology 12 and a second radio access technology 14. For example, the first radio access technology 12 could be code division multiple access, CDMA, technology, whereas the second radio access technology 14 could be long term evolution, LTE, technology. A first base station 16 operates according to the first radio access technology 12 and a second base station 18 operates according to the second radio access technology 14. Note that the base stations 16 and 18 may be at separate locations or may be collocated and share equipment such as antennas, radios and baseband processors.

Each base station 16 and 18 may receive uplink signals from a user equipment 20. For instance, desired uplink signals from the user equipment 20 may be received by the base station 18 that is currently serving the user equipment 20. However, that same uplink signal may be received as an interference signal by the base station 16 that is currently not serving the user equipment 20. This can occur, for example when the base station 16 of the first radio access technology 12 covers a sector that overlaps a sector covered by the base station 18 of the second radio access technology 14. For example, the user equipment may be transmitting using an LTE carrier frequency of the base station 18, whereas a receiver of the base station 16 may be tuned to receive signals at a CDMA carrier frequency that is adjacent to the LTE carrier frequency. Energy from the LTE signal of the user equipment 20 may spill into the adjacent CDMA frequency band of the base station 16, causing interference at the base station 16.

In some embodiments, the base station 16 may scan by frequency to detect the presence of interfering signals in a frequency band that is adjacent to an operating frequency band of the base station 16. The interfering signal may be detected when, for example, the first radio access technology is CDMA, based on the ratio of the measured received signal strength indicator, RSSI, over each individual CDMA channel, and carrier received energy over noise, $E_c N_o$, over the entirety of the frequency band, where the two values for comparison having been normalized per Hz. In the presence of interference to the right edge of the CDMA 1.25 MHz carrier, the compared ratio of these one or more CDMA channels at the right edge of the carrier will exceed a predetermined value over the filtered average ratio over the CDMA carrier. The interfering signal may be detected from measurements of uplink interference plus noise for each physical resource block, PRB, at a band edge when, for example, the first radio access technology is LTE. In the presence of interference to the left edge of the 10 MHz LTE carrier, for example, the measured interference plus noise for the frequencies or subcarriers at the left edge will exceed a predetermined value over the filtered average over the entirety of the LTE carrier.

Interference measurements may be averaged over time to smooth out any spurious interference measurements. The averaged interference measurement may be compared to a threshold to determine whether to report the measured interference to a first interference coordination proxy 22. If the measured interference is to be reported to the first interference coordination proxy 22, the sector ID of the sector from which the interfering signal is received is also reported. The sector ID may be associated with a sector range, elevation and/or an angular sector, and GPS coordinates (and thus the interference report will include such information). The report may also contain a frequency or frequency band at which the interference was detected, a level of the interference, and a time stamp indicating a time at which the interference was measured.

The interference measurements and associated information may be communicated to the first interference coordination proxy 22. The first interference coordination proxy 22 may be collocated with a base station 16 or may be separate from the base station 16. The first interference coordination proxy 22 may include a receiver 24, a processor 26, and a transmitter 28. The receiver 24 receives the interference measurements and associated information from one or more of the base stations 16. The processor 26 produces an interference control request based on the interference measurements and associated information. The interference control request may include the frequency band of the interference signal, the power level of the interference, information concerning the sector from which the interference signal was received, and a timestamp indicating a time of measurement of the interference signal. The transmitter 28 may transmit the interference control request to a second interference coordination proxy 30.

The second interference coordination proxy 30 may be collocated with a base station 18 or may be separate from the base station 18. Also, the second interference coordination proxy 30 may be collocated with the first interference coordination proxy 22 or separate there from. The second interference coordination proxy 30 may include a receiver 32, a processor 34 and a transmitter 36. The receiver 32 may receive interference control requests from a plurality of other interference coordination proxies. The processor 34 integrates these interference control requests and identifies likely sources of interference by associating the sector and frequency information contained in the interference control requests with operating frequencies and sectors served by base stations of the second radio access technology. The transmitter 36 may send interference reports that identify sectors and frequencies from which interference is likely to base stations 18 that transmit at the identified frequencies in the identified sectors, along with time stamps that identify when the interference was measured.

A base station 18 receives an interference report and identifies the UEs in an identified sector that transmitted at the identified frequency at the time indicated by the time stamp. The identification of an interfering UE 20 may also be based on received signal strength indicator, RSSI, reference signal received power, RSRP, and reference signal received quality, RSRQ, measurements, whether or not the UE 20 is at its maximum transmit power, as well as determinations of UE range and proximity of the UE 20 to the base station receiving the interference. When the second radio access technology 14 is CDMA 1x/1xAdvanced, an interfering UE 20 may be identified based on its power control headroom, received code power, RCP, and/or periodic transmit power report. The list of UEs determined to be interferers may be filtered based on a configured round trip delay threshold. Thus, UEs that are closed to the center of the identified sector of the first radio access technology or far from the identified sector of the second radio access technology may be filtered from the list.

Thus, in some embodiments, identifying an interfering UE 20 may include correlating a time at which the interference was detected by the first base station 16 to a time of receiving at the second base station 18 an uplink signal from a UE. Identifying an interfering UE 20 may include determining a distance of the interfering UE 20 based on a round trip delay of a signal of the interfering UE 20. Identifying an interfering UE 20 may include determining a location of the UE 20 based on coordinates of a positioning system received on an uplink control channel of the UE. The positioning system may be, for example, the Global Positioning System, GPS. Identifying an interfering UE 20 may include determining the proximity of the interfering UE 20 to the base station experiencing the interference. Identifying an interfering UE 20 may include determining that the serving base station of the interfering UE 20 is not collocated with the base station experiencing the interference. Identifying an interfering UE 20 may include determining a direction of the interfering UE 20 based on a direction of a signal received from the interfering UE 20. Identifying an interfering UE 20 may include estimating adjacent channel leakage of the interfering UE 20 based on a modeling of UE's uplink emission mask, for instance from 3GPP specifications or pre-stored characteristics of various UE types, and correlating the estimate to the interference level from the interference report.

The base station then may issue a ticket to identified interfering UEs and take steps to reduce interference caused by ticketed UEs. Thus, a base station 18 may identify an interfering UE 20 at least in part by correlating a coverage sector of the first base station 16 with a coverage sector of the base station 18. As used herein, coverage sector refers to an angular sector of a base station that is generally associated with a directional antenna and may be specified by a range, an elevation and an angular sector. Also, or alternatively, the base station 18 may identify an interfering UE 20 at least in part by correlating a frequency of the interfering signal to a frequency assigned to the user equipment 20 by the base station 18. Also, the base station 18 may identify an interfering UE 20 at least in part by correlating a time at which the interference signal was detected at the base station 16 with a time of receiving an uplink from the UE 20 at the base station 18.

Steps that may be taken to suppress interference caused by a ticketed UE 20 include altering resource blocks assigned to the interfering UE 20 and reassigning these resource blocks to other UEs based on a determination that the other UEs to which the resource blocks are reassigned will not significantly interfere. This determination may be made based on an estimated level of interference with other signals caused by the other UEs. For example, the base station 18 may compute the location of other UEs and can estimate the likely interference level to a reported sector of the base station 16 based on the other UE's transmit spectral density, location, orientation, and measured RSSI, RSRP, RSRQ.

Steps that may be taken to suppress interference by a ticketed UE 20, may include altering resource blocks assigned to a physical uplink shared channel, PUSCH, of the ticketed UE. For example, the allocation over PUSCH may be switched to a different frequency away from a band edge of a frequency band of the second radio access technology that is near a frequency band of the first radio access technology. Steps that may be taken to suppress interference caused by a ticketed UE 20 may include reducing a transmit power of the ticketed UE 20 or causing the ticketed UE 20 to distribute its transmissions over a plurality of transmission time intervals, TTI.

Thus, interference suppression may include reassigning to the UE resource blocks that occupy frequencies separated from identified interfering frequencies. The resource blocks may be reassigned to at least one other UE determined based on an estimated level of interference with other signals received by the first base station. The estimated level of interference may be based on at least one of UE transmit spectral density, location, orientation, distance and reported signal quality.

Interference suppression may include preventing the interference UE from being assigned to a physical uplink control channel, PUCCH at the band edge, and may include using a service aware buffer estimation algorithm that avoids sending Scheduling Request SR on the PUCCH.

Interference suppression may include using at least one of an aperiodic Channel Quality Indicator CQI/RI on PUSCH, and an adaptive HARQ re-transmission to allow for flexible scheduling of the UL re-transmissions in the time and frequency domain.

Interference suppression may include reducing a transmit power of the interfering user equipment. Interference suppression may include instructing the interfering UE 20 to handover to a different frequency in a band of the first radio access technology, or instructing the interfering UE 20 to perform inter-technology handover to a frequency band of the second radio access technology. Interference suppression may include distributing transmissions by the interfering user equipment 20 over a plurality of transmission time intervals, TTI.

For example, when the second radio access technology is CDMA 1xRTT/1xAdvanced, interference may be suppressed at least partially by assigning a lower codec rate to an uplink transmission of the UE 20. Also, or in the alternative, the interfering carrier frequency may be removed from an active set and other non-interfering carriers may be added to the active set. When the second radio access technology 14 is CDMA EVDO, interference may be suppressed by adjusting reverse traffic channel media access control, RTCMAC, parameters of the interfering UE 20 so that it uses lower power transmission and shorter uplink packets. Also, or in the alternative, the UE 20 may be instructed to lower its allowed reverse rate indication, RRI, limit. Also, in the alternative, the interfering carrier frequency in the active set may be removed or replaced with other carriers which do not interfere.

In the embodiment of FIG. 2, the first interference coordination proxy 22, in addition to sending interference control requests to the second interference coordination proxy 30, may receive interference control requests from the second interference coordination proxy 30. These received interference control requests are processed by the processor 26 to determine likely sources of interference and to generate interference reports sent to the base stations 16. Responsive to receiving these interference reports, a base station 16 may identify an interfering UE and suppress interference from the identified interfering UE.

As noted above, the first interference coordination proxy 22 may be collocated or merged with the second interference coordination proxy 30 when the base stations 16 and 18 of each radio access technology are collocated, to achieve faster access times. Thus, in the case that each radio access technology shares a common base station, joint scheduling and interference prediction can be employed to avoid interference between the two radio access technologies.

Figure 3:
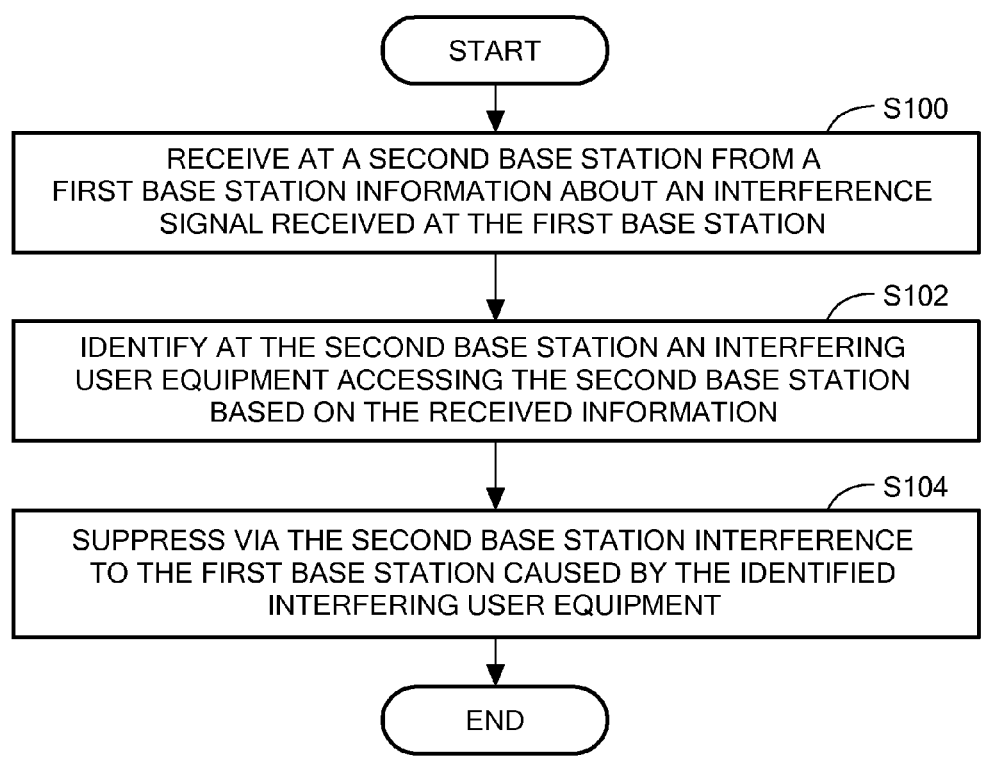
FIG. 3 is a flowchart of an exemplary process for interference coordination between a first and second base station according to principles of the present invention.

FIG. 3 is a flowchart of an exemplary process for determining an interfering UE and suppressing its interference where the functions of the first and second interference coordination proxies described above are integrated into respective base stations 16 and 18. A second base station 18 receives information about an interference signal from a first base station 16 (S100). The second base station 18 identifies an interfering UE 20 accessing the second base station 18 based on the received information (S102). The second base station 18 then takes steps to suppress the interference caused by the identified interfering UE 20 (S104). Exemplary interference suppression steps are discussed above.

Figure 4:
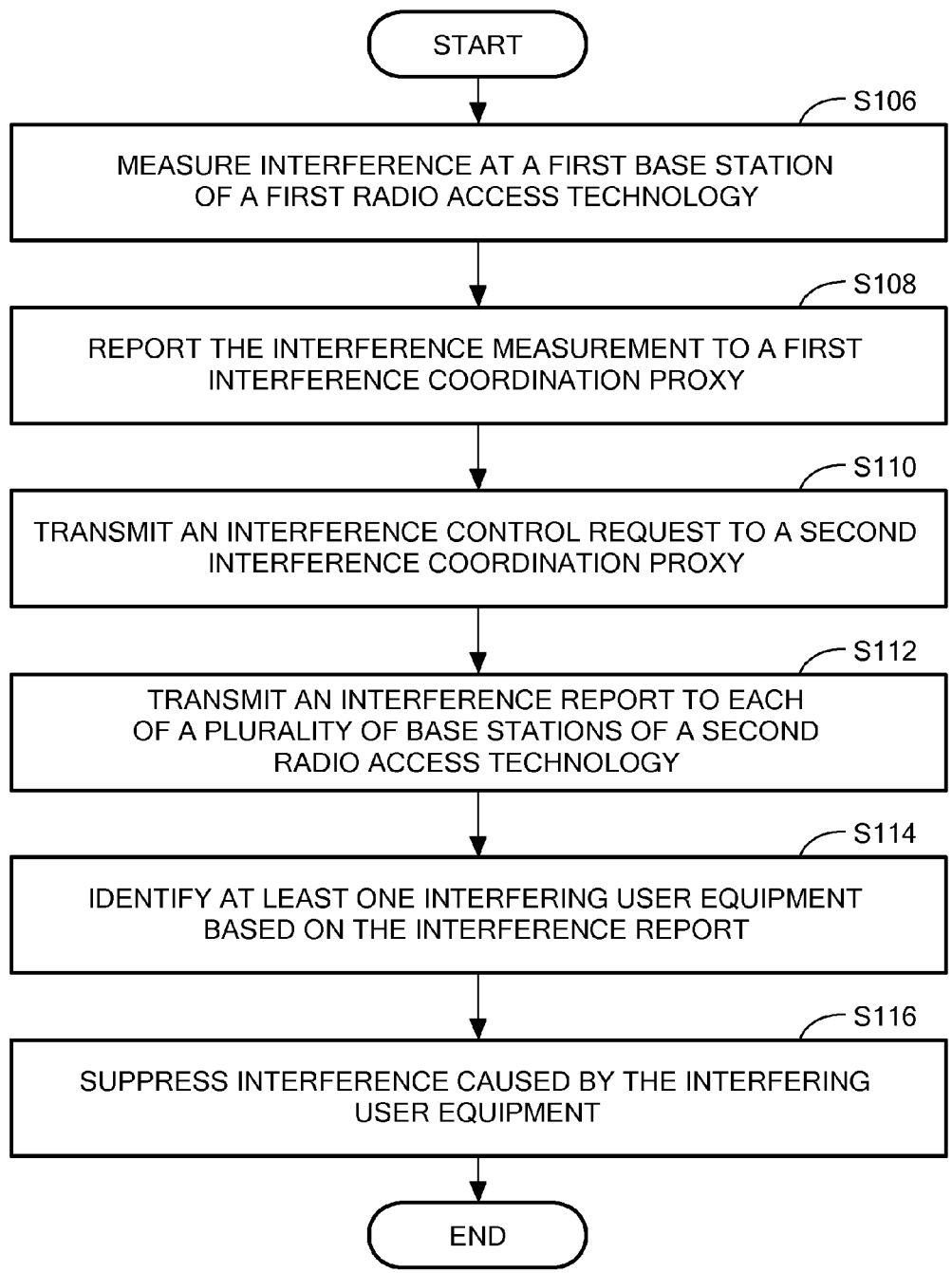
FIG. 4 is a flowchart of an exemplary process for interference coordination using interference coordination proxies according to principles of the present invention.

FIG. 4 is a flowchart of an exemplary process for determining an interfering UE and suppressing its interference using a first and second interference coordination proxy 22 and 30. Interference is measured at a first base station 16 of a first radio access technology 12 (S106). The interference measurement is sent from the base stations 16 to a first interference coordination proxy 22 (S108). The sector from which the interfering signal is received and the frequency of the interfering signal are also transmitted to the first interference coordination proxy 22. The first interference coordination proxy 22 transmits an interference control request to the second interference coordination proxy 30 (S110). The second interference coordination proxy 30 identifies a corresponding sector of the second radio access technology 14 and a corresponding UE transmit frequency and transmits an interference report containing this information to each of a plurality of base stations 18 of the second radio access technology 14 (S112). A base station 18 identifies an interfering UE 20 based on information of the interference report (S114). The base station then takes one or more steps to suppress interference by the interfering UE (S116). Exemplary steps for interference suppression are described above.

Figure 5:
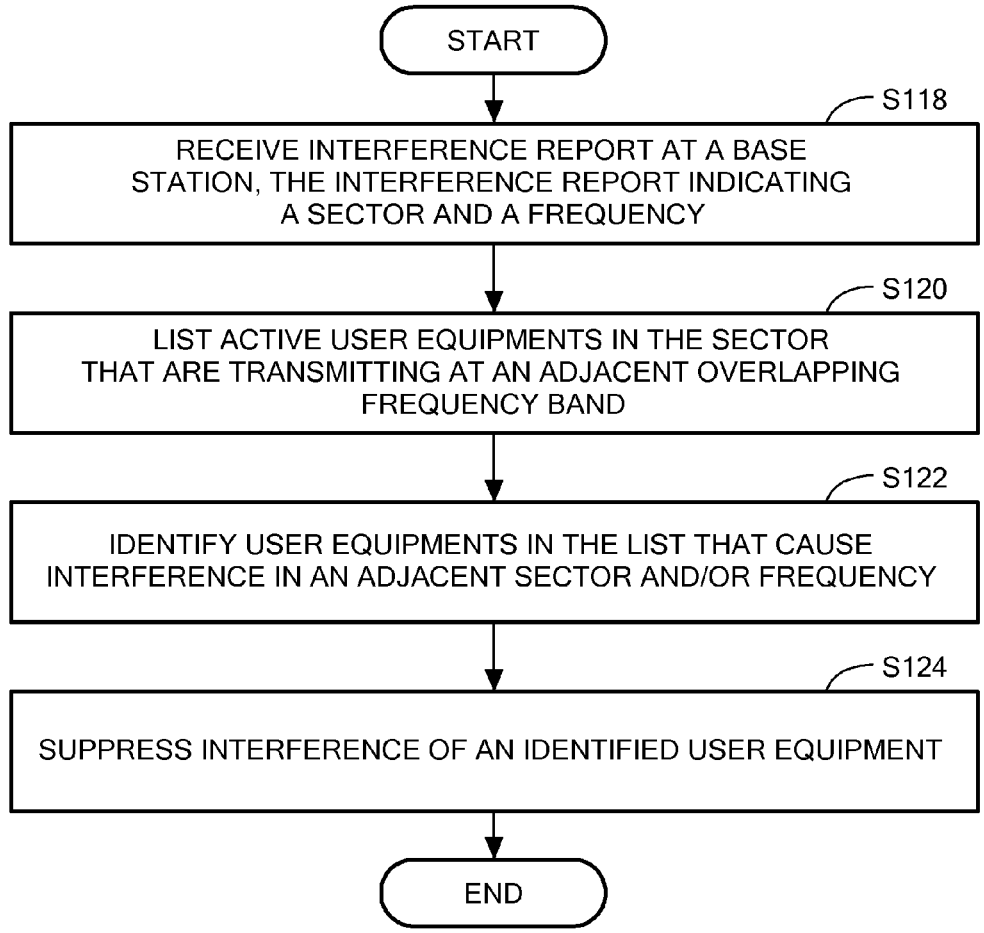
FIG. 5 is a flowchart of an exemplary process for identifying an interfering user equipment according to principles of the present invention.

FIG. 5 is a flowchart of an exemplary process for identifying an interfering UE by a base station. A base station such as base station 16 or 18 receives an interference report from a respective interference coordination proxy 22 or 30 that indicates a frequency and a sector of the interfering UE (S118). The base station prepares a list of active UEs in the sector that are transmitting at or close to the indicated frequency (S120). UEs in the list of active UEs that are causing interference in an adjacent sector and/or frequency may be identified (S122). This may be UEs having a transmit power exceeding a threshold. The base station may suppress interference caused by the identified UEs (S124). For example, the base station may instruct the UEs whose transmit powers exceed the threshold to reduce their transmit powers. This can be done, for example, by changing the UE path loss compensation and the closed loop power control received target power through radio resource control, RRC, in order to lower UE transmit power.

As noted above, the base station may take other additional or alternative steps to suppress interference by an interfering UE. For example, the base station may cause the UE transmissions on the physical uplink shared channel, PUSCH, to include information such as a channel quality indicator, CQI, instead of transmitting this information on the physical uplink control channel, PUCCH, at a band edge. Another way of reducing interference is to use radio resource management, RRM, features to avoid a voice over Internet protocol, VoIP, user from having to send scheduling requests on the PUCCH. Another way of reducing interference is to use adaptive hybrid automated repeat request, HARQ, re-transmissions to enable flexible scheduling of uplink and downlink re-transmissions in the time domain and the frequency domain so that the re-transmissions can be moved to PUSCH resource blocks that cause the least interference. Another method to reduce interference is to simply allocate PUCCH resources away from a band edge.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile tangible storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of coordinated interference suppression in a communication system implementing at least a first radio access technology via a first base station and a second radio access technology via a second base station, the second radio access technology being different from the first radio access technology, the method comprising:
   receiving, from a first device associated with the first base station, at a second device associated with the second base station, information relating to an interference signal received at the first base station via the first radio access technology, the information relating to an interference signal including a time at which the interference signal was received by the first base station;
   sending an interference report to the second base station, the interference report including the time at which the interference signal was received by the first base station;
   identifying, at the second base station, an interfering user equipment, UE, accessing the second base station via the second radio access technology, the identifying including correlating the time at which the interference signal was received by the first base station to a time of receiving at the second base station an uplink signal from a UE; and suppressing, via the second base station, an interference caused by the interfering user equipment.

2. The method of claim 1, wherein the information relating to the interference signal includes at least one of a sector identification, a frequency of the interference signal, and a level of interference of the interference signal.

3. The method of claim 1, wherein identifying the interfering user equipment includes correlating a coverage sector of the first base station with a coverage sector of the second base station.

4. The method of claim 3, wherein a coverage sector is specified by at least one of a range, location, an elevation and an angular sector.

5. The method of claim 1, wherein identifying the interfering user equipment includes correlating a frequency of the interference signal to a frequency assigned to a user equipment by the second base station.

6. The method of claim 1, wherein identifying the interfering user equipment further includes at least one of:
    determining a distance of the interfering UE based on a round trip delay of a signal of the interfering UE;
    determining a location of the UE based on coordinates of a positioning system received on an uplink control channel of the UE;
    correlating a estimated adjacent channel leakage level of the UE to the interference level reported in the interference report based on modeling of UE emission characteristics;
    determining a proximity of the interfering UE to the first base based on respective coordinates of the interfering UE and the first base station; and
    determining a direction of the interfering UE based on a direction of a signal received from the UE.

7. The method of claim 1, wherein suppressing an interference caused by the interfering user equipment, UE, includes reassigning to the UE resource blocks that occupy frequencies separated from identified interfering frequencies.

8. The method of claim 7, wherein resource blocks assigned to the interfering user equipment are reassigned to at least one other user equipment.

9. The method of claim 8, wherein the at least one other user equipment is determined based on an estimated level of interference with other signals received by the first base station, wherein the estimated level of interference is based on at least one of UE transmit spectral density, location, orientation, proximity and reported signal quality.

10. The method of claim 1, wherein suppressing an interference caused by the interfering user equipment includes moving transmission of uplink control information of the interfering user equipment from a physical uplink control channel, PUCCH, to a physical uplink shared channel, PUSCH, by using at least one of an aperiodic CQI/RI report, a service aware buffer estimation, and an adaptive HARQ re-transmission.

11. The method of claim 1, wherein suppressing an interference caused by the interfering user equipment, UE, includes at least one of:
    reducing a transmit power of the interfering user equipment;
    instructing the interfering UE to handover to a different frequency in a band of the first radio access technology; and
    instructing the interfering UE to perform inter-technology handover to a frequency band of the second radio access technology.

12. The method of claim 1, wherein suppressing an interference caused by the interfering user equipment includes distributing transmissions by the interfering user equipment over a plurality of transmission time intervals, TTI.

13. An interference coordination device adapted to communicate with a first set of at least one base station operating according to a first radio access technology, the interference coordination device comprising:
    a receiver, the receiver configured to receive information relating to an interference signal received by a second base station operating according to a second radio access technology, the second radio access technology being different from the first radio access technology, the received information relating to an interference signal including a time at which the interference signal was received by the second base station;
    a processor, the processor configured to identify at least one likely source of interference originating in a sector covered by at least one of the first set of at least one base station to produce an interference report, the identifying of the at least one likely source of interference being based on the information received by the receiver; and
    a transmitter, the transmitter configured to transmit the interference report produced by the processor to at least one of the first set of at least one base station, the interference report having information to enable a base station of the first set to identify an interfering user equipment, the identifying of the interfering user equipment including correlating the time at which the interference signal was received by the second base station to a time of receiving at one of the first set of at least one base station an uplink signal from a user equipment.

14. The interference coordination device of claim 13, wherein the received information includes at least one of:
    an identification of a sector of the second base station from which the interference signal is received;
    a frequency of the interfering signal;
    an interference level of the interfering signal, and
    a time stamp associated with the interfering signal.

15. The interference coordination device of claim 14, wherein the processor determines a sector of a base station in the first set that corresponds to the sector of the second base station from which the interference signal is received.

16. The interference coordination device of claim 13, wherein the processor integrates information about interference signals received by a plurality of base stations operating according to the second radio access technology.

17. The interference coordination device of claim 13, wherein a likely source of interference is determined by identifying base stations of the first set that are communicating at a frequency adjacent to a frequency of the interference signal in a sector that corresponds to a sector from which the interference signal is received.

18. The interference coordination device of claim 13, wherein the interference coordination proxy is located at a base station of the first set.

19. A communication system configured to implement interference coordination between two different radio access technologies, the communication system comprising:
    a first interference coordination device, the first interference coordination device configured to receive interference measurements from a first base station associated with a first radio access technology;

a second interference coordination device in communication with the first interference coordination device, the second interference coordination device configured to:

receive interference control requests from the first interference coordination device based on the interference measurements, the interference control requests including a time at which an interference signal is received at the first interference coordination device; and transmit first interference information to a second base station associated with a second radio access technology, the second radio access technology being different from the first radio access technology, the first interference information including the time at which the interference signal is received at the first coordination device, enabling the second radio base station to correlate the time at which the interference signal is received to a time of receiving at the second base station an uplink signal from a user equipment.

20. The communication system of claim 19, wherein the first interference coordination device and the second interference coordination device are collocated.

21. The communication system of claim 19, wherein the first interference coordination device receives interference control requests from the second interference coordination device based on interference measurements from the second base station, and transmits second interference information to the first base station.

22. The communication system of claim 19, wherein the first interference coordination device is located at the first base station.

23. The communication system of claim 22, wherein the second interference coordination device is located at the second base station.

* * * * *